United States Patent
Tiirola et al.

(10) Patent No.: US 12,075,449 B2
(45) Date of Patent: Aug. 27, 2024

(54) BLIND PHYSICAL BROADCAST CHANNEL DETECTION FOR NARROWBAND NEW RADIO

(71) Applicant: NOKIA TECHNOLOGIES OY, Oulu (FI)

(72) Inventors: Esa Tapani Tiirola, Oulu (FI); Sami-Jukka Hakola, Kempele (FI); Kari Juhani Hooli, Oulu (FI); Jorma Johannes Kaikkonen, Oulu (FI); Pasi Eino Tapio Kinnunen, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 188 days.

(21) Appl. No.: 17/365,526

(22) Filed: Jul. 1, 2021

(65) Prior Publication Data
US 2023/0007626 A1    Jan. 5, 2023

(51) Int. Cl.
*H04L 5/00*         (2006.01)
*H04L 27/26*        (2006.01)
(Continued)

(52) U.S. Cl.
CPC ......... *H04W 72/30* (2023.01); *H04W 56/001* (2013.01); *H04W 72/0453* (2013.01); *H04W 72/23* (2023.01)

(58) Field of Classification Search
None
See application file for complete search history.

(56) References Cited

U.S. PATENT DOCUMENTS 11,425,667 B2 *    8/2022    Da ........................ H04W 56/00
11,533,144 B2 *   12/2022    Manolakos ........... H04L 5/0053
(Continued)

FOREIGN PATENT DOCUMENTS

EP       3606235 A1    2/2020
WO    2020009552 A1    1/2020
(Continued)

OTHER PUBLICATIONS

3GPP TS 38.101-1 V15.13.0 (Mar. 2021), 3rd Generation Partnership Project; Technical Specification Group Radio Access Network; NR; User Equipment (UE) Radio Transmission and Reception; Part 1: Range 1 Standalone (Release 15), 3GPP, 5G, 241 pages.
(Continued)

*Primary Examiner* — Sithu Ko
(74) *Attorney, Agent, or Firm* — SQUIRE PATTON BOGGS (US) LLP

(57) ABSTRACT

Systems, methods, apparatuses, and computer program products for blind physical broadcast channel detection for narrowband new radio. The method may include detecting at least one synchronization signal. The method may also include determining, in response to detecting the synchronization signal, whether one or more predefined conditions of a user equipment have been met. At least one candidate pattern of a physical broadcast channel may be determined when the one or more predefined conditions have been met. The physical broadcast channel may be received with the at least one candidate pattern of the physical broadcast channel. Based on a determination of whether the physical broadcast channel was correctly received, a system information block physical downlink control channel may be received with the at least one candidate pattern of the physical broadcast channel, or the at least one candidate pattern of the physical broadcast channel may be modified.

23 Claims, 9 Drawing Sheets

(51) Int. Cl.
*H04W 56/00* (2009.01)
*H04W 72/0453* (2023.01)
*H04W 72/23* (2023.01)
*H04W 72/30* (2023.01)

(56) References Cited

U.S. PATENT DOCUMENTS

| | | | | |
|---|---|---|---|---|
| 11,751,208 | B2* | 9/2023 | Rastegardoost | H04W 72/23 |
| | | | | 370/329 |
| 11,778,536 | B2* | 10/2023 | Kim | H04W 4/70 |
| | | | | 370/329 |
| 11,895,604 | B2* | 2/2024 | Kim | H04W 48/10 |
| 2015/0085717 | A1* | 3/2015 | Papasakellariou | H04W 48/12 |
| | | | | 370/280 |
| 2019/0028315 | A1* | 1/2019 | Park | H04L 27/2692 |
| 2019/0159148 | A1* | 5/2019 | Jung | H04W 56/006 |
| 2021/0274451 | A1* | 9/2021 | Lei | H04L 27/2666 |
| 2022/0166569 | A1* | 5/2022 | Lin | H04L 5/005 |
| 2022/0330242 | A1* | 10/2022 | Zhou | H04L 5/0044 |

FOREIGN PATENT DOCUMENTS

| | | | | |
|---|---|---|---|---|
| WO | 2021031897 | A1 | 2/2021 | |
| WO | WO-2022165468 | A1 * | 8/2022 | H04L 5/005 |

OTHER PUBLICATIONS

Nokia et al. RWS-210121. Railway, Smart Grid and PPDR support in Rel-18. RAN Rel-19 Workshop, Jun. 28-Jul. 2, 2021.
International Search Report and Written Opinion dated Aug. 30, 2022, corresponding International Application No. PCT/FI2022/050312.

* cited by examiner

| Frequency range | SS Block frequency position $S_{REF}$ | GSCN | Range of GSCN |
|---|---|---|---|
| 0-3000 MHz | N * 1200kHz = M * 50 kHz, N = 1:2499, M ∈ {1,3,5} (Note 1) | 3N+(M-3)/2 | 2-7498 |
| 3000-24250 MHz | 3000kHz = N * 1.44 MHz, N = 0:14756 | 7499+N | 7499-22255 |
| NOTE 1: The default value for operating bands with SCS spaced channel raster is M=3. | | | |

| "GSM" RX power level [dB vs PBCH | dSNR [dB] with 2 PRBs compared to reference | dSNR [dB] with 4 PRBs compared to reference | dSNR [dB] with 6 PRBs compared to reference |
|---|---|---|---|
| -100 | 1.16 | 2.94 | 4.17 |
| -10 | 1.2 | 3.09 | 4.3 |
| -6 | 1.27 | 3.27 | 4.72 |
| -3 | 1.36 | 3.69 | 5.56 |
| 0 | 1.59 | 5.25 | 12.5 |

FIG. 6

BLIND PHYSICAL BROADCAST CHANNEL DETECTION FOR NARROWBAND NEW RADIO

FIELD

Some example embodiments may generally relate to mobile or wireless telecommunication systems, such as Long Term Evolution (LTE) or fifth generation (5G) radio access technology or new radio (NR) access technology, or other communications systems. For example, certain example embodiments may relate to apparatuses, systems, and/or methods for blind physical broadcast channel detection for narrowband new radio.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. Fifth generation (5G) wireless systems refer to the next generation (NG) of radio systems and network architecture. 5G network technology is mostly based on new radio (NR) technology, but the 5G (or NG) network can also build on E-UTRAN radio. It is estimated that NR will provide bitrates on the order of 10-20 Gbit/s or higher, and will support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) are named gNB when built on NR technology and named NG-eNB when built on E-UTRAN radio.

SUMMARY

Some example embodiments may be directed to a method. The method may include detecting at least one synchronization signal. The method may also include determining, in response to detecting the synchronization signal, whether one or more predefined conditions of a user equipment have been met. The method may further include determining at least one candidate pattern of a physical broadcast channel when the one or more predefined conditions have been met. In addition, the method may include receiving the physical broadcast channel with the at least one candidate pattern of the physical broadcast channel. Further, the method may include, based on a determination of whether the physical broadcast channel was correctly received, receiving a system information block physical downlink control channel with the at least one candidate pattern of the physical broadcast channel, or modifying the at least one candidate pattern of the physical broadcast channel.

Other example embodiments may be directed to an apparatus. The apparatus may include at least one processor and at least one memory including computer program code. The at least one memory and computer program code may also be configured to, with the at least one processor, cause the apparatus at least to detect at least one synchronization signal. The apparatus may also be caused to determine, in response to detecting the synchronization signal, whether one or more predefined conditions of the apparatus have been met. The apparatus may further be caused to determine at least one candidate pattern of a physical broadcast channel when the one or more predefined conditions have been met. In addition, the apparatus may be caused to receive the physical broadcast channel with the at least one candidate pattern of the physical broadcast channel. Further, the apparatus may be caused to, based on a determination of whether the physical broadcast channel was correctly received, receive a system information block physical downlink control channel with the at least one candidate pattern of the physical broadcast channel, or modify the at least one candidate pattern of the physical broadcast channel.

Other example embodiments may be directed to an apparatus. The apparatus may include means for detecting at least one synchronization signal. The apparatus may also include means for determining, in response to detecting the synchronization signal, whether one or more predefined conditions of a user equipment have been met. The apparatus may further include means for determining at least one candidate pattern of a physical broadcast channel when the one or more predefined conditions have been met. In addition, the apparatus may include means for receiving the physical broadcast channel with the at least one candidate pattern of the physical broadcast channel. Further, the apparatus may include means for, based on a determination of whether the physical broadcast channel was correctly received, receiving a system information block physical downlink control channel with the at least one candidate pattern of the physical broadcast channel, or modifying the at least one candidate pattern of the physical broadcast channel.

In accordance with other example embodiments, a non-transitory computer readable medium may be encoded with instructions that may, when executed in hardware, perform a method. The method may include detecting at least one synchronization signal. The method may also include determining, in response to detecting the synchronization signal, whether one or more predefined conditions of a user equipment have been met. The method may further include determining at least one candidate pattern of a physical broadcast channel when the one or more predefined conditions have been met. In addition, the method may include receiving the physical broadcast channel with the at least one candidate pattern of the physical broadcast channel. Further, the method may include, based on a determination of whether the physical broadcast channel was correctly received, receiving a system information block physical downlink control channel with the at least one candidate pattern of the physical broadcast channel, or modifying the at least one candidate pattern of the physical broadcast channel.

Other example embodiments may be directed to a computer program product that performs a method. The method may include detecting at least one synchronization signal. The method may also include determining, in response to detecting the synchronization signal, whether one or more predefined conditions of a user equipment have been met. The method may further include determining at least one candidate pattern of a physical broadcast channel when the one or more predefined conditions have been met. In addition, the method may include receiving the physical broadcast channel with the at least one candidate pattern of the physical broadcast channel. Further, the method may include, based on a determination of whether the physical broadcast channel was correctly received, receiving a system information block physical downlink control channel with the at least one candidate pattern of the physical broadcast channel, or modifying the at least one candidate pattern of the physical broadcast channel.

Other example embodiments may be directed to an apparatus that may include circuitry configured to detect at least one synchronization signal. The apparatus may also include circuitry configured to determine, in response to detecting the synchronization signal, whether one or more predefined conditions of the apparatus have been met. The apparatus may further include circuitry configured to determine at least one candidate pattern of a physical broadcast channel when the one or more predefined conditions have been met. In addition, the apparatus may include circuitry configured to receive the physical broadcast channel with the at least one candidate pattern of the physical broadcast channel. Further, the apparatus may include circuitry configured to based on a determination of whether the physical broadcast channel was correctly received, receive a system information block physical downlink control channel with the at least one candidate pattern of the physical broadcast channel, or modify the at least one candidate pattern of the physical broadcast channel.

BRIEF DESCRIPTION OF THE DRAWINGS

For proper understanding of example embodiments, reference should be made to the accompanying drawings, wherein:

FIG. 6 illustrates an example table of PBCH detection options, according to certain example embodiments.

DETAILED DESCRIPTION

It will be readily understood that the components of certain example embodiments, as generally described and illustrated in the figures herein, may be arranged and designed in a wide variety of different configurations. The following is a detailed description of some example embodiments of systems, methods, apparatuses, and computer program products for blind physical broadcast channel detection for narrowband new radio.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily refer to the same group of embodiments, and the described features, structures, or characteristics may be combined in any suitable manner in one or more example embodiments.

Narrowband new radio (NB NR) is an emerging scenario driven by the future of global railway communication needs, as well as some smart grid and public safety operating environments. However, NB NR solutions may also be applicable to other scenarios including, but not limited to, for example, smartphone and/or Internet of Things (IoT) deployments for certain narrow bandwidth (BW) deployments (e.g., below 1 GHz carrier frequency). As such, certain aspects may be of consideration including, for example, reception of punctured physical broadcast channel (PBCH). In certain cases, punctured PBCH may be used to narrow down the BW of synchronization signal blocks (SSBs) in order to match the available BW.

In some scenarios, it may be beneficial to enable the operation of 5G NR in a narrower BW than 5 MHz channels for which it was originally designed. For example, deployment of NR in the 900 MHz future railway mobile communication system (FRMCS) band needs to take place alongside legacy global system for mobile communications— railway (GSM-R) carriers within a 5.6 MHz bandwidth, which permits about 3.6 MHz to be used for NR in one deployment example. In other examples, other GSM channels may be spaced at 200 kHz. Thus, GSM may reserve N×200 kHz in principle, and the rest may be available for NR. Similarly, there may be some cases where 3 MHz channels are available for NR. However, in other cases, depending on the scenario, the actual BW may differ from the examples described above.

Figure 1:
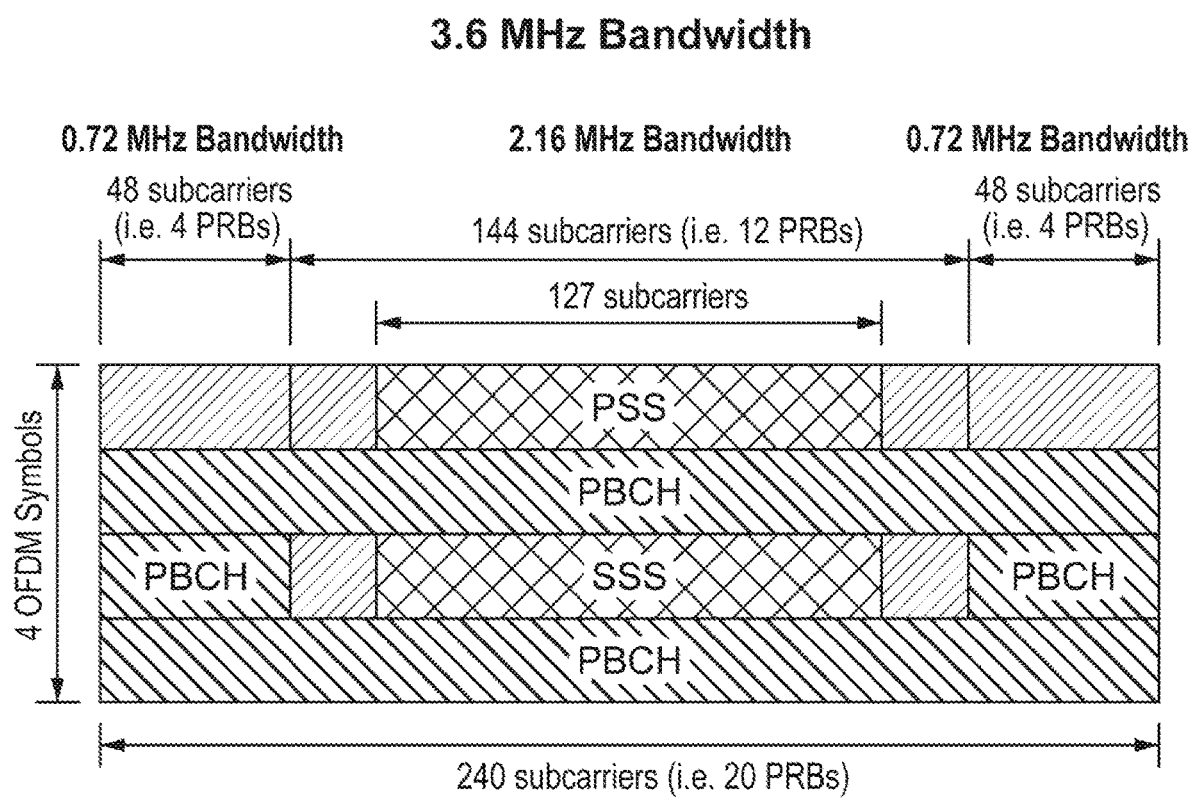
FIG. 1 illustrates an example new radio (NR) initial access signals and channels with 15 kHz subcarrier spacing.
Figures 2, 3:
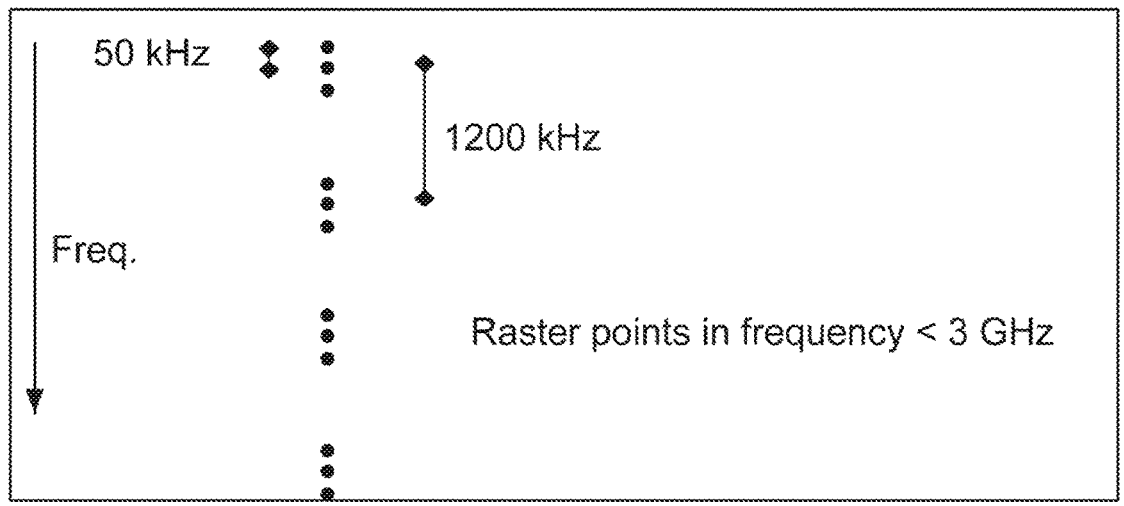
FIG. 2 illustrates an example table of global synchronization channel number (GSCN) parameters for a global frequency raster.
FIG. 3 illustrates an example of synch raster points at below 3 GHz, which are defined in clusters of three points.

FIG. 1 illustrates an example NR initial access signals and channels with 15 kHz subcarrier spacing. As illustrated in the example of FIG. 1, the essential signals and channels transmitted by the NR base stations (gNBs) were not designed for transmission in such narrow channels. Further, in an initial cell selection (e.g., initial access), the UE may search for a primary synchronization signal (PSS) on the predefined synch raster points. In other words, the synchronization raster may indicate the frequency positions of the synchronization signal block (SSB) that can be used by the user equipment (UE) for system acquisition when explicit signaling of the SB position is not present. In addition, a global synchronization raster may be defined for all frequencies. The frequency position of the SSB may be defined as the frequency position of the SSB (SSREF) with a corresponding number such as, for example, a global synchronization channel number (GSCN). This is illustrated in, for example, FIG. 2, which illustrates an example table of GSCN parameters for the global frequency raster. Additionally, FIG. 3 illustrates an example of synch raster points at below 3 GHz, which are defined in clusters of three points.

It may be possible, in some cases, to use NR in a narrower BW than 5 MHz in which it may be assumed that the SSs and system information (SI) transmissions may be redesigned. This may be based on, for example, smaller subcarrier spacing (e.g., 7.5 kHz) which would reduce the SSB BW by 50% (compared to 15 kHz SCS), or a new SSB structure (e.g. SSB comprising more than four OFDM symbols). This may be a fundamental change to the design of NR, which may adversely impact the ecosystem. Thus, a mechanism may be needed to adapt NR to such narrower BWs. Such a mechanism may include, for example puncturing the PBCH rather than recoding and remapping it. Alternatively, rate matching may provided as a different approach to adapt NR to narrower BWs. With puncturing, the transport block may be prepared according to the original size (i.e., in frequency and time). Additionally, the transmitter may ignore transmission of certain (punctured) resource elements. Moreover, the receiver may operate with or without the knowledge of the puncturing on the resources used by the transmitter. In other words, the receiver may correctly decode the transport block (TB) if it does not use the correct assumption of puncturing. In other cases, puncturing may refer to a scenario where the transmitter (e.g., gNB) does not transmit the prepared modulated symbols in certain resource elements. Furthermore, in rate matching (or remapping), the TB block may be prepared for a new (i.e., smaller) resource size. In certain cases of rate matching, the receiver may not be able to correctly decode the TB if it uses the wrong assumption for the resource size at the receiver.

Figures 4, 5:
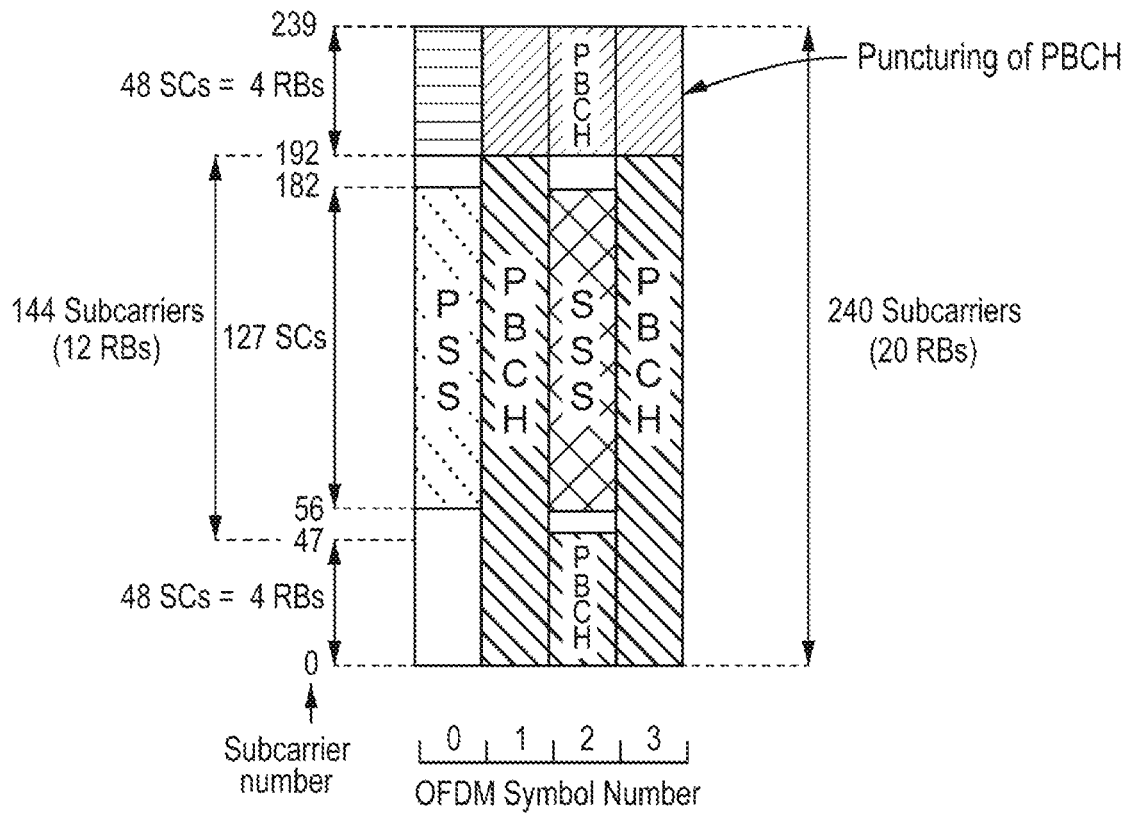
FIG. 4 illustrates an example table of performance degradation due to puncturing.
FIG. 5 illustrates an example of a physical broadcast channel (PBCH) with asymmetric puncturing with no remapping.

Depending on the scenario, the UE may not be aware of the actual BW of the PBCH. If the UE operates according to the BW of the complete PBCH (as shown in FIG. 1), the UE may suffer from significant performance degradation as shown in FIG. 4. In particular, FIG. 4 illustrates an example table of performance degradation due to puncturing.

In an example case scenario, the UE may suffer from performance degradation when there is a one-sided puncturing of the PBCH, as illustrated in FIG. 5. In particular, FIG. 5 illustrates an example of PBCH with asymmetric puncturing with no remapping. In this example case scenario, additive white Gaussian noise (AWGN) interference may be used to mimic GSM-R interference. Additionally, in this example case scenario, the gNB may not transmit PBCH on those GSM-R "PRBs", and the UE may assume that the detection is performed on a complete PBCH bandwidth (i.e., wrong PBCH Tx BW). As illustrated in the example table of FIG. 4, degradation on signal-to-noise ratio (dSNR) that is required for adequate PBCH detection performance is shown for different amounts of PRB puncturing (i.e., 2, 4, and 6 PRBs). In other words, dSNR indicates how much higher SNR should be so that the UE reaches adequate PBCH detection performance when compared to PBCH transmitted and detected on complete PBCH bandwidth of 20 RBs.

In some cases, depending on the interference power, PBCH detection performance may be degraded by more than 5 dB. This would mean that the UE is frequently unable to access the cell. Additionally, in deployment scenarios such as GSM-R refarming, the GSM and NR BS may likely be co-located to the same sites, making the higher GSM power levels more probable.

In one scenario, the UE may have knowledge of the actual Tx BW. However, this may be problematic since the SSB (including the PBCH) may be the first signal that the UE detects. In this case, something may be determined implicitly, for example, based on the synch raster location, or by other means. However, the problem may be that it may introduce a fixed relationship between the PBCH and BW. Furthermore, it may be seen as a significant change for the current structure. Thus, in certain example embodiments, the PBCH BW may be varied according to coexistence scenarios, which may change over time. Such a change may be due to progress on the GSM-R refarming.

Certain example embodiments may provide a PBCH blind detection arrangement for the UE. For instance, when certain predefined conditions are met, the UE may try to decode the PBCH not only using 20 PRBs, but also with other predefined BW assumptions. In certain example embodiments, the predefined conditions may include, but not limited to, the UE operating in a predefined frequency range (e.g., FR1). The predefined conditions may also include the UE operating in a predefined frequency band(s) (e.g., FRMCS band, 2×5.6 MHz FDD and 874.4-880 MHz/ 919.4-925 MHz). Additionally, the predefined conditions may include the UE detecting PBCH with a predefined numerology (e.g., 15 kHz subcarrier spacing (SCS)). In certain example embodiments, the above listed predefined conditions and other predefined conditions not listed may vary depending on the use case and scenario.

Figure 6:
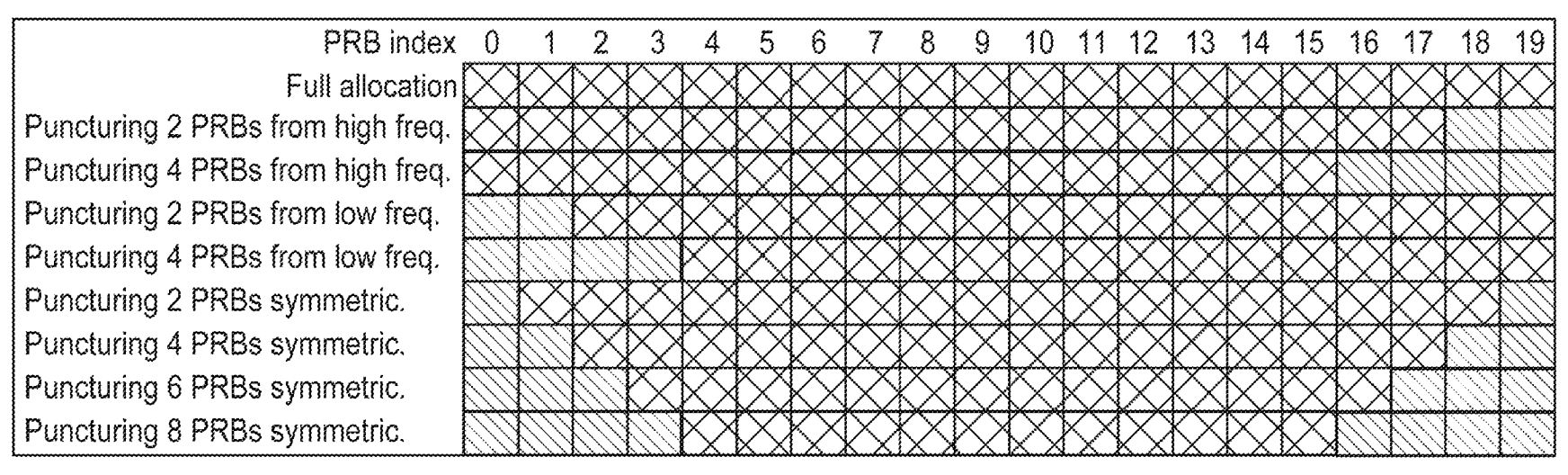

FIG. 6 illustrates an example table of PBCH detection options, according to certain example embodiments. In certain example embodiments, when the predefined conditions are satisfied, the UE may perform PBCH detection with the current PBCH BW assumption (e.g., full allocation in FIG. 6), and also using one or more predefined BW assumptions. In other example embodiments, the BW assumptions may include one or more of the puncturing options shown in the example table of FIG. 6. According to certain example embodiments, puncturing "x" number of PRBs may correspond to a PBCH being prepared for full allocation. However, in some example embodiments, the BS may not transmit on the punctured PRBs, and the UE may perform detection assuming (20-X) PRBs. In other example embodiments, instead of puncturing, the UE may decode with different rate matching options for PBCH while performing multiple detections. In this case, the difference compared to puncturing may be that in those scenarios, PBCH may be prepared with an assumption that the PBCH block is prepared for different numbers of PRBs (rather than punctured).

In certain example embodiments, the UE may perform detection of the punctured PBCH in a predefined order. In particular, according to some example embodiments, the UE may try a detection option of the punctured PBCH, for example, with the highest BW first. However, in other example embodiments, there may be a predefined priority order instead of starting from the highest BW. If the detection fails, the UE may try to detect the next highest BW PBCH, and so on. In doing so, it may be possible to provide support for physical downlink control channel (PDCCH) detection with the right BW hypothesis (i.e., estimate). According to certain example embodiments, this may be seen as a UE BW configuration for an initial Rx operation including SSB (secondary synchronization signal (SSS)/ primary synchronization signal (PSS), and PBCH) and PDCCH detection and related operations.

In certain example embodiments, when the UE may receive PBCH correctly with the puncturing hypothesis (considered as estimated PBCH puncturing pattern), the UE may assume that the PDCCH transmitted via control resource set #0 (CORESET #0) is also transmitted with reduced BW. Thus, the UE may use the estimated PBCH puncturing pattern for receiving PDCCH for system information block n (SIBn) and paging scheduling, which may include SIB1. In particular, in certain example embodiments, the downlink control information (DCI) in PDCCH may provide scheduling grant for the PDSCH, which may then carry SIBn and paging content. It may also be possible that DCI (On PDCCH) already has some system information included. According to certain example embodiments, when receiving the PDCCH for SIB1, the UE may mask the PBCH pattern with a control channel element (CCE) structure (i.e., it may not consider punctured CCEs as valid CCE). In other words, the UE may assume that CCEs that would be partially punctured are not transmitted.

Figure 7:
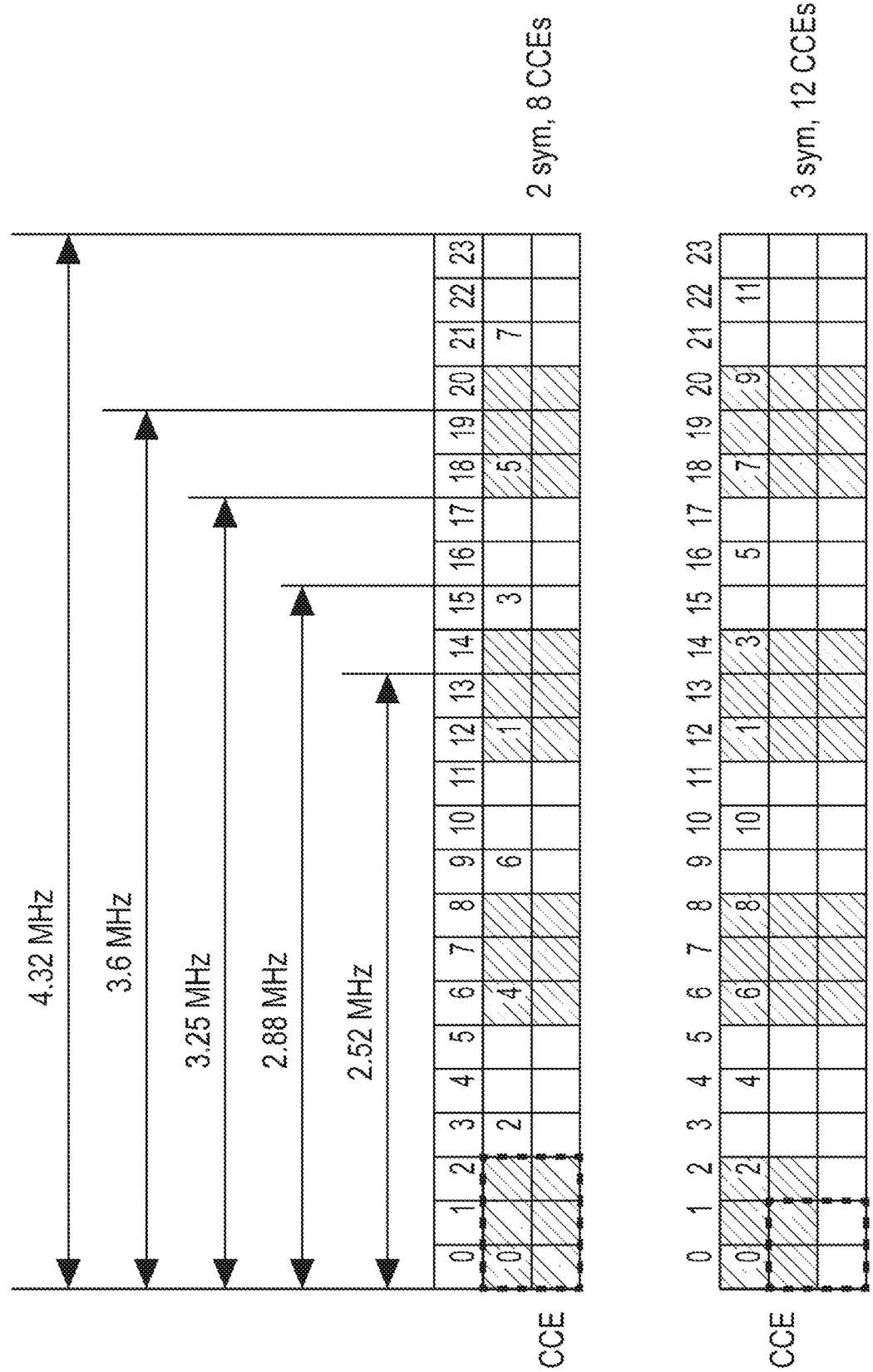
FIG. 7 illustrates an example of 2-symbol and 3-symbol structures, according to certain example embodiments.

FIG. 7 illustrates an example of 2-symbol and 3-symbol structures for CORESET #0 with 24 PRBs, according to certain example embodiments. In particular, FIG. 7 illustrates the CCE structure for 2-symbol and 3-symbol CORESET #0, and assumes that the lowest frequency of PBCH and CORESET #0 are aligned. In other example embodiments, the UE may use CORESET #0 and PBCH relative locations in the frequency domain to validate the PBCH puncturing pattern. For instance, in certain example embodiments, when either one of CORESET #0 resource edges is aligned with (full allocation) PBCH edge, asymmetric puncturing patterns puncturing the other (not aligned) CORESET #0 edge are valid. The puncturing hypothesis may be corrected to the closest (smallest number of resource blocks (RBs) with changed puncturing/no puncturing assumptions) valid puncturing pattern. When neither of the CORESET #0 resource edges are aligned with a (full allocation) PBCH edge, symmetric puncturing patterns are valid. Additionally, the puncturing hypothesis may be corrected to the closest (smallest number of RBs with changed puncturing/no puncturing assumptions) valid puncturing pattern.

According to certain example embodiments, SIB1 may include the information for the actual BW used in transmissions, in which case a new information element may be needed. According to other example embodiments, the UE may determine whether the puncturing is assumed at the high frequency or the low frequency, or the order for using or testing PBCH puncturing patterns whether to start from the patterns with puncturing on the high frequency or the low frequency. In certain example embodiments, this determination may be based on the synchronization raster point of the detected PSS. In certain example embodiments, the high frequency and the low frequency may be defined according to PRB indexes within the initial DL BWP. In particular, low frequency may correspond to the lowest indexes, and high frequency may correspond to the high frequencies. According to certain example embodiments, the initial BWP may cover the PRBs occupied by the CORESET #0.

Figure 8:
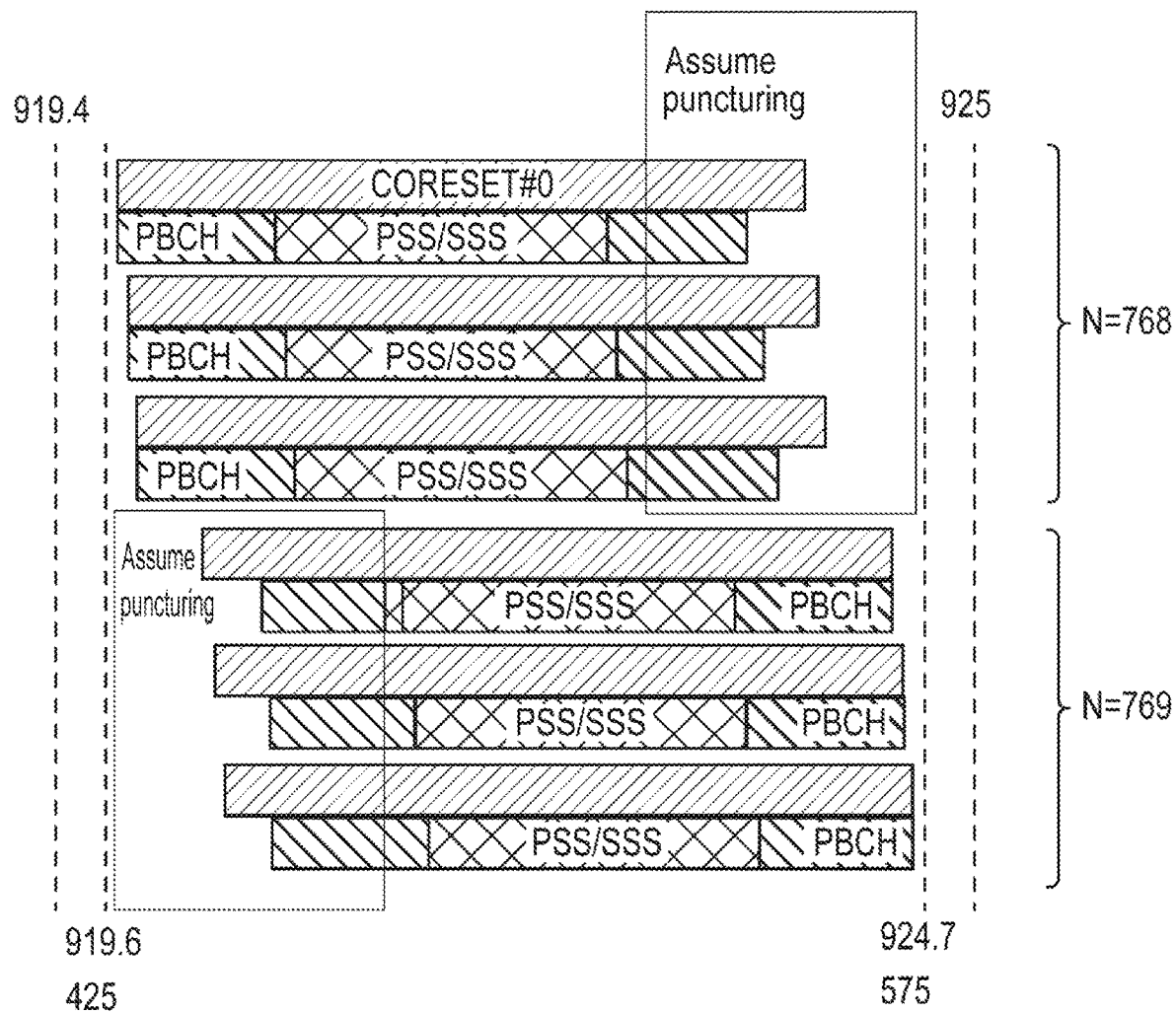
FIG. 8 illustrates an example puncturing pattern with respect to synch raster points, according to certain example embodiments.

FIG. 8 illustrates an example puncturing pattern with respect to synch raster points, according to certain example embodiments. For instance, according to some example embodiments, when the synch raster point is at a lower frequency of the channel of interest, the UE may assume puncturing may be at high frequencies. Correspondingly, when the synch raster point is at a higher frequency of the channel of interest, the UE may assume puncturing may be at the low frequency. This principle is illustrated in the example of FIG. 8, where the channel of interest is 919.4-925 MHz (DL), and N values 768 and 769 indicating cluster index of the synch raster points for the lower frequency and higher frequency of the channel, respectively. In certain example embodiments, it may be specified that the UE may assume that the RE overlapping in the frequency domain with PSS (and SSS) are not punctured for example, for detection of PBCH/PDCCH (CORESET #0).

According to certain example embodiments, the UE (implementation) may adjust the PBCH puncturing assumption/order in a detection accounting the prevailing signal conditions (estimated, for example, based on PSS/SSS quality) so that in good signal quality conditions, larger puncturing (lowest BW) may be given priority as it may provide sufficient quality for correct detection, while reducing the detection effort/time. In this case, the UE may use the successful PBCH puncturing hypothesis for SIB1 PDCCH blind decoding. Additionally, in case of PDCCH detection failure(s), the UE may use the PBCH puncturing hypothesis with a wider BW.

In other example embodiments, the UE may be provided with assistance information via, for example, a subscriber identity module (SIM), to determine which of the possible puncturing assumptions are possible (i.e., a subset of possible puncturing patterns or list of puncturing patterns. The puncturing patterns not included in the subset are not applied). According to certain example embodiments, the subcarrier-based resource element granularity may be applied (instead of the default PRB granularity) for BW detection of the punctured PBCH. This may allow for fine tuning of the BW for optimizing system performance against RF criteria given for operation BW and its adjacent carrier regulations.

Additionally, certain example embodiments may include various tracks. In a first track, the possible puncturing pattern may be predefined for the relevant scenarios. Additionally, when receiving the PBCH, the UE may be expected to detect the PBCH with all determined puncturing patterns. In certain example embodiments, the UE may detect the PBCH with all determined puncturing patterns in a predefined order.

Figure 9:
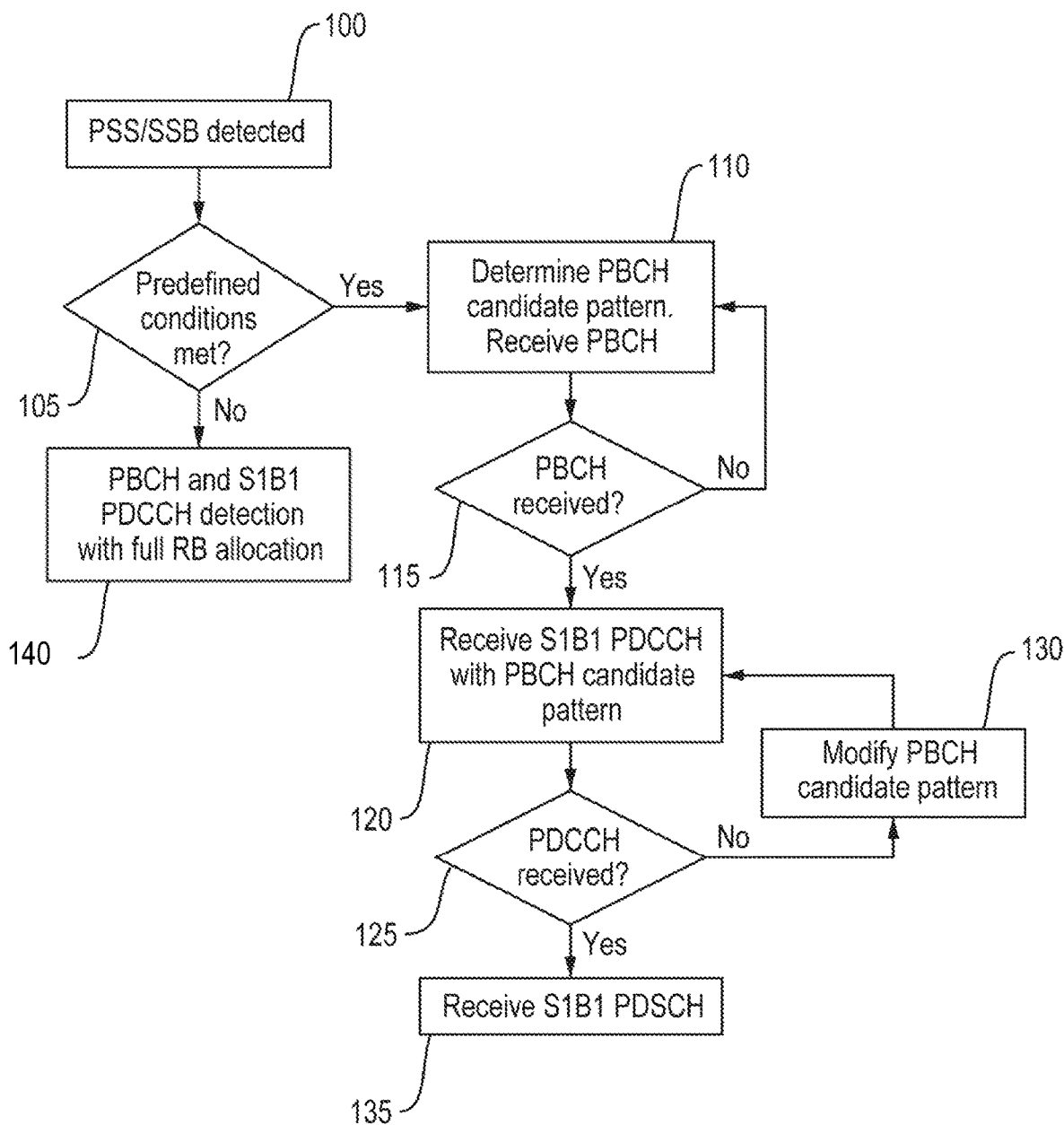
FIG. 9 illustrates a flow chart of an example implementation by a user equipment (UE), according to certain example embodiments.

In a second track, the UE may determine the puncturing patterns by implementation. An example of such implementation is illustrated in FIG. 9. In particular, FIG. 9 illustrates a flow chart of an example implementation by the UE, according to certain example embodiments. At 100, the UE may detect the PSS and/or SSB. At 105, the UE may determine whether certain predefined conditions of the UE have been met. If no, at 140, the UE may detect a PBCH and SIB1 PDCCH with a full RB allocation. However, if the predefined conditions have been met, at 110, the UE may determine a PBCH candidate pattern, and receive the PBCH. At 115, the UE may determine whether the PBCH has been received. According to certain example embodiments, determination of whether the PBCH has been received may be based on a cyclic redundancy check (CRC). If no, the flow may return to 110 and determine another PBCH candidate pattern or modify the PBCH candidate pattern. However, if yes, at 120, the UE may receive the SIB1 PDCCH with the PBCH candidate pattern. At 125, the UE may determine whether the PDCCH has been received. According to certain example embodiments, determination of whether the PDCCH has been received may be based on a cyclic redundancy check (CRC). If no, at 130, the UE may modify the PBCH candidate pattern, and return to 120. However, if yes, at 135, the UE may receive an SIB1 PDSCH.

Figure 10:
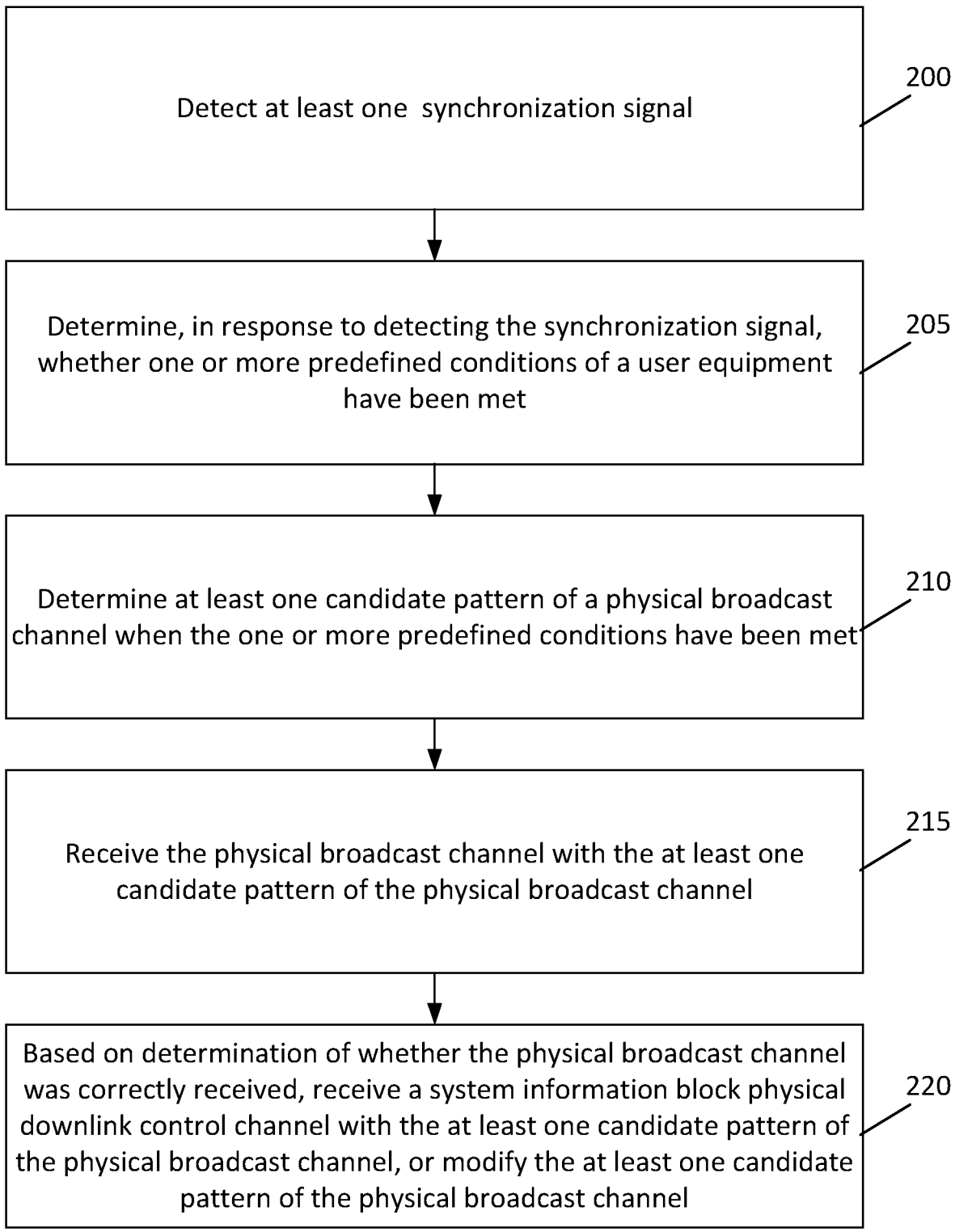
FIG. 10 illustrates an example flow diagram of a method, according to certain example embodiments.

FIG. 10 illustrates an example flow diagram of a method, according to certain example embodiments. In an example embodiment, the method of FIG. 10 may be performed by a network entity, network node, or a group of multiple network elements in a 3GPP system, such as LTE or 5G-NR. For instance, in an example embodiment, the method of FIG.

Figure 11A:
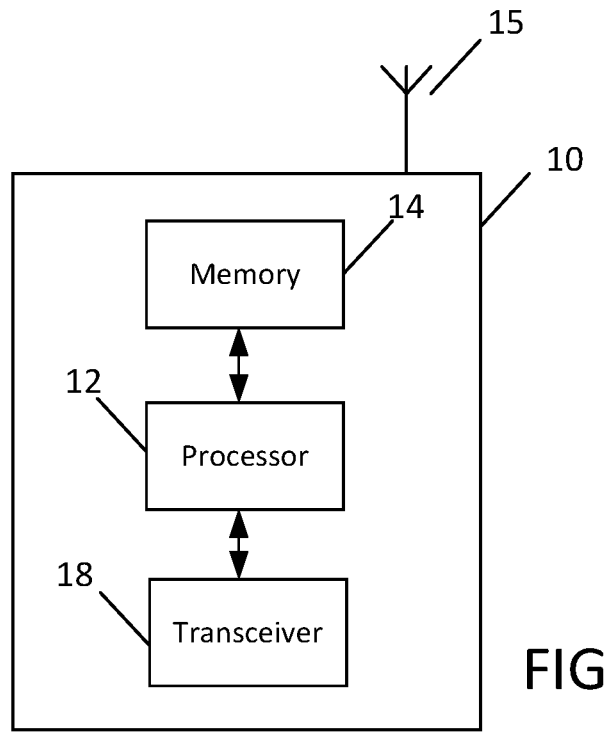
FIG. 11(a) illustrates an apparatus, according to certain example embodiments.
Figure 11B:
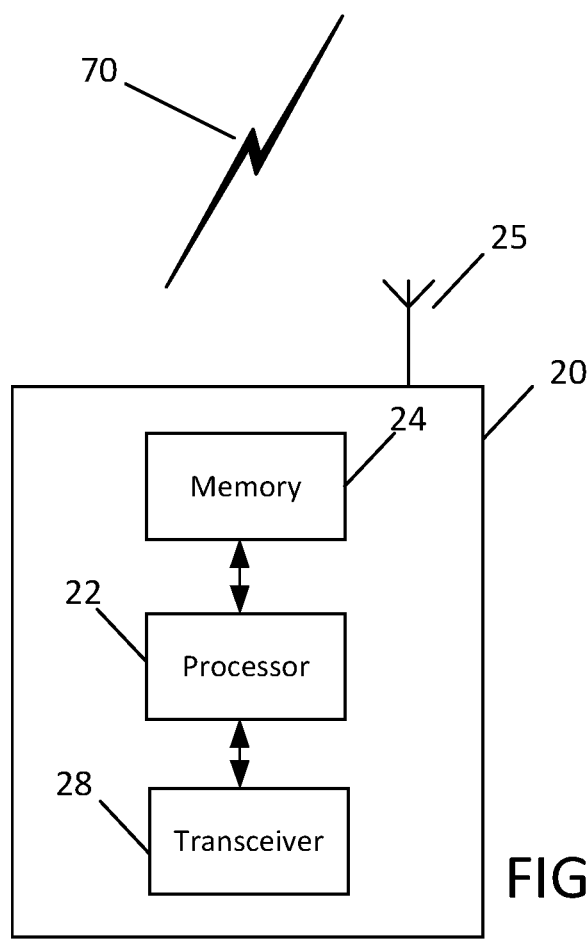
FIG. 11(b) illustrates another apparatus, according to certain example embodiments.

10 may be performed by a UE, for instance, similar to one of apparatuses 10 or 20 illustrated in FIGS. 11(a) and 11(b).

According to certain example embodiments, the method of FIG. 10 may include, at 200, detecting at least one synchronization signal. At 205, the method may include determining, in response to detecting the synchronization signal, whether one or more predefined conditions of a user equipment have been met. At 210, the method may include determining at least one candidate pattern of a physical broadcast channel when the one or more predefined conditions have been met. Further, at 215, the method may include receiving the physical broadcast channel with the at least one candidate pattern of the physical broadcast channel. In addition, at 220, the method may include, based on determination of whether the physical broadcast channel was correctly received, receiving a system information block physical downlink control channel with the at least one candidate pattern of the physical broadcast channel, or modifying the at least one candidate pattern of the physical broadcast channel.

According to certain example embodiments, the method may also include based on the determination of whether the physical downlink control channel was received, receiving a system information block physical downlink shared channel, or modifying the at least one candidate pattern of the physical broadcast channel In certain example embodiments, the at least one candidate pattern of the physical broadcast channel may be determined in a predefined order of candidate patterns. According to other example embodiments, the predefined order may include detection based on a bandwidth value of the physical broadcast channel According to some example embodiments, the method may also include after the at least one candidate pattern of the physical broadcast channel has been modified, performing a new attempt to receive a physical radio channel until a predefined number of attempts have been reached.

In certain example embodiments, the method may further include masking a pattern of the physical broadcast channel with a control channel element structure. In some example embodiments, the method may also include validating the at least one candidate pattern of the physical broadcast channel by using a control resource set and physical broadcast channel relative locations in the frequency domain. In other example embodiments, the method may include determining that the at least one candidate pattern of the physical broadcast channel is assumed based on a synchronization raster point of the detected synchronization signal, or determining an order of candidate patterns of the physical broadcast channel based on the synchronization raster point of the detected synchronization signal. According to certain example embodiments, the method may further include receiving a system information block physical downlink control channel with the at least one candidate pattern. According to other example embodiments, the system information block physical downlink control channel may be received with the at least one candidate pattern of the physical broadcast channel, and receiving the system information block physical downlink control channel may include receiving the physical broadcast channel or a physical downlink control channel on resource blocks indicated by the at least one candidate pattern.

FIG. 11(a) illustrates an apparatus 10 according to certain example embodiments. In certain example embodiments, apparatus 10 may be a node or element in a communications network or associated with such a network, such as a UE, mobile equipment (ME), mobile station, mobile device, stationary device, or other device. It should be noted that one of ordinary skill in the art would understand that apparatus 10 may include components or features not shown in FIG. 11(a).

In some example embodiments, apparatus 10 may include one or more processors, one or more computer-readable storage medium (for example, memory, storage, or the like), one or more radio access components (for example, a modem, a transceiver, or the like), and/or a user interface. In some example embodiments, apparatus 10 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 10 may include components or features not shown in FIG. 11(a).

As illustrated in the example of FIG. 11(a), apparatus 10 may include or be coupled to a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 11(a), multiple processors may be utilized according to other example embodiments. For example, it should be understood that, in certain example embodiments, apparatus 10 may include two or more processors that may form a multiprocessor system (e.g., in this case processor 12 may represent a multiprocessor) that may support multiprocessing. According to certain example embodiments, the multiprocessor system may be tightly coupled or loosely coupled (e.g., to form a computer cluster).

Processor 12 may perform functions associated with the operation of apparatus 10 including, as some examples, precoding of antenna gain/phase parameters, encoding and decoding of individual bits forming a communication message, formatting of information, and overall control of the apparatus 10, including processes illustrated in FIGS. 1-10.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In certain example embodiments, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10 to perform any of the methods illustrated in FIGS. 1-10.

In some example embodiments, apparatus 10 may also include or be coupled to one or more antennas 15 for receiving a downlink signal and for transmitting via an uplink from apparatus 10. Apparatus 10 may further include a transceiver 18 configured to transmit and receive information. The transceiver 18 may also include a radio interface (e.g., a modem) coupled to the antenna 15. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 18 may be configured to modulate information on to a carrier waveform for transmission by the antenna(s) 15 and demodulate information received via the antenna(s) 15 for further processing by other elements of apparatus 10. In other example embodiments, transceiver 18 may be capable of transmitting and receiving signals or data directly. Additionally or alternatively, in some example embodiments, apparatus 10 may include an input and/or output device (I/O device). In certain example embodiments, apparatus 10 may further include a user interface, such as a graphical user interface or touchscreen.

In certain example embodiments, memory 14 stores software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software. According to certain example embodiments, apparatus 10 may optionally be configured to communicate with apparatus 20 via a wireless or wired communications link 70 according to any radio access technology, such as NR.

According to certain example embodiments, processor 12 and memory 14 may be included in or may form a part of processing circuitry or control circuitry. In addition, in some example embodiments, transceiver 18 may be included in or may form a part of transceiving circuitry.

For instance, in certain example embodiments, apparatus 10 may be controlled by memory 14 and processor 12 to detect at least one synchronization signal. Apparatus 10 may also be controlled by memory 14 and processor 12 to determine, in response to detecting the synchronization signal, whether one or more predefined conditions of the apparatus have been met. Apparatus 10 may further be controlled by memory 14 and processor 12 to determine at least one candidate pattern of a physical broadcast channel when the one or more predefined conditions have been met. In addition, apparatus 10 may be controlled by memory 14 and processor 12 to receive the physical broadcast channel with the at least one candidate pattern of the physical broadcast channel. Further, apparatus 10 may be controlled by memory 14 and processor 12 to, based on determination of whether the physical broadcast channel was correctly received, receive a system information block physical downlink control channel with the at least one candidate pattern of the physical broadcast channel, or modify the at least one candidate pattern of the physical broadcast channel.

FIG. 11(b) illustrates an apparatus 20 according to certain example embodiments. In certain example embodiments, the apparatus 20 may be a node or element in a communications network or associated with such a network, such as a base station, a Node B, an evolved Node B (eNB), 5G Node B or access point, next generation Node B (NG-NB or gNB), BS, and/or WLAN access point, associated with a radio access network (RAN), such as an LTE network, 5G or NR. It should be noted that one of ordinary skill in the art would understand that apparatus 20 may include components or features not shown in FIG. 11(b).

As illustrated in the example of FIG. 11(b), apparatus 20 may include a processor 22 for processing information and executing instructions or operations. Processor 22 may be any type of general or specific purpose processor. For example, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 11(b), multiple processors may be utilized according to other example embodiments. For example, it should be understood that, in certain example embodiments, apparatus 20 may include two or more processors that may form a multiprocessor system (e.g., in this case processor 22 may represent a multiprocessor) that may support multiprocessing. In certain example embodiments, the multiprocessor system may be tightly coupled or loosely coupled (e.g., to form a computer cluster).

According to certain example embodiments, processor 22 may perform functions associated with the operation of apparatus 20, which may include, for example, precoding of antenna gain/phase parameters, encoding and decoding of individual bits forming a communication message, formatting of information, and overall control of the apparatus 20, including processes illustrated in FIGS. 1-9.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In certain example embodiments, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20 to perform the methods illustrated in FIGS. 1-9.

In certain example embodiments, apparatus 20 may also include or be coupled to one or more antennas 25 for transmitting and receiving signals and/or data to and from apparatus 20. Apparatus 20 may further include or be coupled to a transceiver 28 configured to transmit and receive information. The transceiver 28 may include, for example, a plurality of radio interfaces that may be coupled to the antenna(s) 25. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 28 may be configured to modulate information on to a carrier waveform for transmission by the antenna(s) 25 and demodulate information received via the antenna(s) 25 for further processing by other elements of apparatus 20. In other example embodiments, transceiver 18 may be capable of transmitting and receiving signals or data directly. Additionally or alternatively, in some example embodiments, apparatus 20 may include an input and/or output device (I/O device).

In certain example embodiment, memory 24 may store software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to some example embodiments, processor 22 and memory 24 may be included in or may form a part of processing circuitry or control circuitry. In addition, in some example embodiments, transceiver 28 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10 and 20) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

In some example embodiments, an apparatus (e.g., apparatus 10 and/or apparatus 20) may include means for performing a method, a process, or any of the variants discussed herein. Examples of the means may include one or more processors, memory, controllers, transmitters, receivers, and/or computer program code for causing the performance of the operations Certain example embodiments may be directed to an apparatus that includes means for performing any of the methods described herein including, for example, means for detecting at least one synchronization signal. The apparatus may also include means for determining, in response to detecting the synchronization signal, whether one or more predefined conditions of a user equipment have been met. The apparatus may further include means for determining at least one candidate pattern of a physical broadcast channel when the one or more predefined conditions have been met. In addition, the apparatus may include means for receiving the physical broadcast channel with the at least one candidate pattern of the physical broadcast channel. Further, the apparatus may include means for, based on determination of whether the physical broadcast channel was correctly received, receiving a system information block physical downlink control channel with the at least one candidate pattern of the physical broadcast channel, or modifying the at least one candidate pattern of the physical broadcast channel.

Certain example embodiments described herein provide several technical improvements, enhancements, and/or advantages. In some example embodiments, it may be possible for the PBCH performance to be similar to a scenario where the UE has full knowledge of the actual puncturing pattern (see FIG. 6). Additionally, when comparing values in Table 1 and Table 2, it can be noted that there is a significant performance difference between the two cases. For example, —3 dB in the case of 4PRBs and 0 dB interference power (with respect to the PBCH power).

Other example embodiments may provide a scalable solution for the gNB to adjust the PBCH puncturing pattern based on the scenario. For instance, in the case of GSM refarming, PBCH puncturing may be reduced in time (e.g., as the amount of GSM terminals reduces). Certain example embodiments may also eliminate the need for additional signaling, and enable the PBCH structure to remain unchanged. Additional example embodiments may help with improving PDCCH reception, and reduce additional UE complexity.

In some example embodiments, an apparatus may include or be associated with at least one software application, module, unit or entity configured as arithmetic operation(s), or as a program or portions of programs (including an added or updated software routine), which may be executed by at least one operation processor or controller. Programs, also called program products or computer programs, including software routines, applets and macros, may be stored in any apparatus-readable data storage medium and may include program instructions to perform particular tasks. A computer program product may include one or more computer-executable components which, when the program is run, are configured to carry out some example embodiments. The one or more computer-executable components may be at least one software code or portions of code. Modifications and configurations required for implementing the functionality of an example embodiment may be performed as routine(s), which may be implemented as added or updated software routine(s). In one example, software routine(s) may be downloaded into the apparatus As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to certain example embodiments, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with procedures in a different order, and/or with hardware elements in configurations which are different than those which are disclosed. Therefore, although the invention has been described based upon these example embodiments, it would be apparent to those of skill in the art that certain modifications, variations, and alternative constructions would be apparent, while remaining within the spirit and scope of example embodiments. Although the above embodiments refer to 5G NR and LTE technology, the above embodiments may also apply to any other present or future 3GPP technology, such as LTE-advanced, and/or fourth generation (4G) technology.

Partial Glossary

3GPP 3rd Generation Partnership Project
5G 5th Generation
5GCN 5G Core Network
BS Base Station
BW Bandwidth
CCE Control Channel Element
CORESET Control Resource Set
eNB Enhanced Node B
FR1 Frequency Range 1
FRMCS Future Railway Mobile Communication System
GSCN Global Synchronization Channel Number
gNB 5G or Next Generation NodeB
GSM-R GSM Railway
LTE Long Term Evolution
MIB Master Information Block
NR New Radio
PBCH Physical Broadcast Channel
PDCCH Physical Downlink Control Channel
PSS Primary Synchronization Signal
RS Reference Signal
SCS Subcarrier Spacing
SI System Information
SIB System Information Block
SIM Subscriber Identity Module
SSB Synchronization Signal Block
SSREF The Frequency Position of the SS Block
SSS Secondary Synchronization Signal
UE User Equipment

We claim:

1. An apparatus, comprising:
at least one processor; and
at least one memory comprising computer program code,
the at least one memory and the computer program code are configured, with the at least one processor, to cause the apparatus at least to
detect at least one synchronization signal;
determine, in response to detecting the synchronization signal, whether one or more predefined conditions of the apparatus have been met;
determine, when the one or more predefined conditions have been met, that at least one candidate puncturing pattern of physical resource blocks of a physical broadcast channel is assumed based on a synchronization raster point of the detected synchronization signal; and
receive the physical broadcast channel with the at least one candidate puncturing pattern of physical resource blocks of the physical broadcast channel,
wherein the one or more predefined conditions have been met comprises the apparatus operating in a predefined frequency range.

2. The apparatus according to claim 1, wherein the at least one memory and the computer program code are further configured, with the at least one processor, to cause the apparatus at least to:
based on the determination of whether a physical downlink control channel was received,
receive a system information block physical downlink shared channel, or
modify the at least one candidate puncturing pattern of the physical broadcast channel,
wherein the at least one candidate puncturing pattern of the physical broadcast channel is determined in a predefined order of candidate puncturing patterns.

3. The apparatus according to claim 2, wherein the predefined order comprises detection based on a bandwidth value of the physical broadcast channel.

4. The apparatus according to claim 2, wherein the at least one memory and the computer program code are further configured, with the at least one processor, to cause the apparatus at least to, after the at least one candidate puncturing pattern of the physical broadcast channel has been modified:
perform a new attempt to receive a physical radio channel until a predefined number of attempts have been reached.

5. The apparatus according to claim 1, the at least one memory and the computer program code are further configured, with the at least one processor, to cause the apparatus at least to:
mask a pattern of the physical broadcast channel with a control channel element structure.

6. The apparatus according to claim 1, wherein the at least one memory and the computer program code are further configured, with the at least one processor, to cause the apparatus at least to:
validate the at least one candidate puncturing pattern of the physical broadcast channel by using a control resource set and physical broadcast channel relative locations in frequency domain.

7. The apparatus according to claim 1,
wherein a system information block physical downlink control channel is received with the at least one candidate puncturing pattern of the physical broadcast channel, and
wherein receiving the system information block physical downlink control channel comprises receiving the physical broadcast channel or a physical downlink control channel on resource blocks indicated by the at least one candidate puncturing pattern.

8. The apparatus according to claim 1, wherein the at least one memory and the computer program code are further configured, with the at least one processor, to cause the apparatus at least to:

based on a determination of whether the physical broadcast channel was correctly received, receive a system information block physical downlink control channel with the at least one candidate puncturing pattern of the physical broadcast channel, or modify the at least one candidate puncturing pattern of the physical broadcast channel.

9. The apparatus according to claim 1, wherein the at least one memory and the computer program code are further configured, with the at least one processor, to cause the apparatus at least to:

determine an order of candidate puncturing patterns of the physical broadcast channel based on the synchronization raster point of the detected synchronization signal, wherein the determination that at least one candidate puncturing pattern of the physical broadcast channel is assumed based on the synchronization raster point of the detected synchronization signal comprises determination that the at least one candidate puncturing pattern of the physical broadcast channel is assumed based on the order of candidate puncturing patterns of the physical broadcast channel.

10. A method, comprising:

detecting, by a user equipment, at least one synchronization signal;

determining, in response to detecting the synchronization signal, whether one or more predefined conditions have been met;

determining, when the one or more predefined conditions have been met, that at least one candidate puncturing pattern of physical resource blocks of a physical broadcast channel is assumed based on a synchronization raster point of the detected synchronization signal; and receiving the physical broadcast channel with the at least one candidate puncturing pattern of physical resource blocks of the physical broadcast channel, wherein the one or more predefined conditions have been met comprises the user equipment operating in a predefined frequency range.

11. The method according to claim 10, further comprising:

based on the determination of whether a physical downlink control channel was received, receiving a system information block physical downlink shared channel, or modifying the at least one candidate puncturing pattern of the physical broadcast channel, wherein the at least one candidate puncturing pattern of the physical broadcast channel is determined in a predefined order of candidate puncturing patterns.

12. The method according to claim 11, wherein the predefined order comprises detection based on a bandwidth value of the physical broadcast channel.

13. The method according to claim 11, further comprising, after the at least one candidate puncturing pattern of the physical broadcast channel has been modified:

performing a new attempt to receive a physical radio channel until a predefined number of attempts have been reached.

14. The method according to claim 10, further comprising:

masking a pattern of the physical broadcast channel with a control channel element structure.

15. The method according to claim 10, further comprising:

validating the at least one candidate puncturing pattern of the physical broadcast channel by using a control resource set and physical broadcast channel relative locations in frequency domain.

16. The method according to claim 10, wherein a system information block physical downlink control channel is received with the at least one candidate puncturing pattern of the physical broadcast channel, and wherein receiving the system information block physical downlink control channel comprises receiving the physical broadcast channel or a physical downlink control channel on resource blocks indicated by the at least one candidate puncturing pattern.

17. The method according to claim 10, further comprising:

based on a determination of whether the physical broadcast channel was correctly received, receiving a system information block physical downlink control channel with the at least one candidate puncturing pattern of the physical broadcast channel, or modifying the at least one candidate puncturing pattern of the physical broadcast channel.

18. A computer program embodied on a non-transitory computer readable medium, the computer program comprising computer executable code which, when executed by a processor, causes the processor to:

detect at least one synchronization signal;

determine, in response to detecting the synchronization signal, whether one or more predefined conditions of a user equipment have been met;

determine, when the one or more predefined conditions have been met, that at least one candidate puncturing pattern of physical resource blocks of a physical broadcast channel is assumed based on a synchronization raster point of the detected synchronization signal; and receive the physical broadcast channel with the at least one candidate puncturing pattern of physical resource blocks of the physical broadcast channel, wherein the one or more predefined conditions have been met comprises the processor further be caused to operate in a predefined frequency range.

19. The computer program according to claim 18, wherein the computer program comprising computer executable code which, when executed by the processor, further causes the processor to:

based on the determination of whether a physical downlink control channel was received, receive a system information block physical downlink shared channel, or modify the at least one candidate puncturing pattern of the physical broadcast channel, wherein the at least one candidate puncturing pattern of the physical broadcast channel is determined in a predefined order of candidate puncturing patterns.

20. The computer program according to claim 19, wherein the predefined order comprises detection based on a bandwidth value of the physical broadcast channel.

21. The computer program according to claim 19, wherein the computer program comprising computer executable code which, when executed by the processor, further causes the processor to, after the at least one candidate puncturing pattern of the physical broadcast channel has been modified:
   perform a new attempt to receive a physical radio channel until a predefined number of attempts have been reached.

22. The computer program according to claim 18, wherein the computer program comprising computer executable code which, when executed by the processor, further causes the processor to:
   mask a pattern of the physical broadcast channel with a control channel element structure.

23. The computer program according to claim 18, wherein the computer program comprising computer executable code which, when executed by the processor, further causes the processor to:
   validate the at least one candidate puncturing pattern of the physical broadcast channel by using a control resource set and physical broadcast channel relative locations in the frequency domain.

* * * * *